United States Patent [19]

Coenen et al.

[11] 4,259,309
[45] Mar. 31, 1981

[54] METHOD FOR OBTAINING GASEOUS HYDROGEN CHLORIDE FROM DILUTE AQUEOUS HYDROCHLORIC ACID

[75] Inventors: Alfred Coenen; Kurt Kosswig, both of Marl; Ferdinand von Praun, Haltern, all of Fed. Rep. of Germany

[73] Assignee: Chemische Werke Hüls AG, Marl, Fed. Rep. of Germany

[21] Appl. No.: 64,633

[22] Filed: Aug. 8, 1979

[51] Int. Cl.³ ............................................. C01B 7/07
[52] U.S. Cl. ................................... 423/481; 423/488; 564/497
[58] Field of Search ............... 423/481, 488, 240 R; 260/583 N

[56] References Cited

U.S. PATENT DOCUMENTS

| | | | |
|---|---|---|---|
| 3,406,204 | 10/1968 | Bathellier et al. | 260/583 N |
| 3,536,593 | 10/1970 | Hurley et al. | 260/583 N |
| 4,115,530 | 9/1978 | Coenen et al. | 423/488 |

OTHER PUBLICATIONS

Hickinbottom, W., *Reactions of Organic Compounds*, Longmans, Green, N.Y. (1957), pp. 400, 401, 416, 417.

*Primary Examiner*—Brian E. Hearn
*Attorney, Agent, or Firm*—Gilbert L. Wells

[57] ABSTRACT

An improvement in the process for obtaining gaseous hydrogen chloride by extracting dilute aqueous hydrochloric acid with amines wherein:

(a) the aqueous hydrochloric acid is extracted with an amine or a mixture of an amine and an inert, water-immiscible solvent boiling at not less than 120° C., using tertiary alkylamines which contain 14 to 36 carbon atoms in the nitrogen-bonded side chains, which side chains include at most one nitrogen-bonded methyl group and at least one nitrogen-bonded aliphatic radical containing at least 6 carbon atoms, the acid constant $K_a$ of the amine being less than $10^{-3}$;

(b) an inert, water-immiscible solvent boiling at not less than 120° C. is added to the extract, unless the solvent has already been added in stage (a);

(c) the extract is distilled, the resulting vapors are condensed, the water is continuously removed from the two-phase condensate, and the organic phase is returned to the distillation process;

(d) the extract is distilled, under reflux, after the water has been removed, and the gaseous hydrogen chloride liberated at the top of the column is taken off, or the hydrogen chloride is separated off at below the boiling point of the solvent by passing an inert gas stream through the mixture; and (e) the solvent containing the amine is recycled to the extraction process. This process is improved by passing solvent and impurities, if any, over an adsorbent in an adsorption column before being employed in stage (a).

14 Claims, 2 Drawing Figures

METHOD FOR OBTAINING GASEOUS HYDROGEN CHLORIDE FROM DILUTE AQUEOUS HYDROCHLORIC ACID

CROSS-REFERENCES TO RELATED APPLICATIONS

The disclosures of Assignee's copending U.S. patent application of Alfred Coenen et al entitled "Method of Manufacturing Hydrogen Chloride from Solutions of Amine Hydrochlorides," filed Feb. 6, 1979 and having Ser. No. 10.048 and U.S. patent application of Alfred Coenen et al entitled "Purification of Tertiary Amines," filed Aug. 8, 1979 and having Ser. No. 64,808 are incorporated herein.

BACKGROUND OF THE INVENTION

The field of the invention is the manufacture of hydrogen chloride and the present invention is particularly concerned with gaseous hydrogen chloride purification from dilute aqueous hydrochloric acids.

The state of the art of the manufacture and processing of hydrochloric acid may be ascertained by reference to the Kirk-Othmer, "Encyclopedia of Chemical Technology" 2nd ed., vol. 11 (1967) pp. 307–337, particularly pp. 314–315 where it is disclosed that 75% of U.S. hydrochloric acid production for the years 1961-1966 came from chlorination processes, and pp. 315-323 under the section Gas Treatment and West German published application No. 2,633,640 corresponding to U.S. Pat. No. 4,115,530, the disclosures of which are incorporated herein.

In many industrial processes, hydrogen chloride arises as a by-product in the form of dilute aqueous hydrochloric acids, for which there is only a limited industrial use. In order to be able to utilize the hydrogen chloride, present in the form of a dilute, aqueous hydrochloric acid, as a chemical raw material, for example for the preparation of vinyl chloride, ethyl chloride, chloroprene or chlorosulphonic acid, the hydrogen chloride must be isolated as an anhydrous gas.

The working up of dilute acids by distillation, required to achieve this, is ruled out for reasons of economy because the amounts of energy which have to be provided to evaporate the water are too great. Extractive isolation of the HCl gas has hitherto failed because of the unfavorable partition coefficients between HCl and extractants, such as, for example, pentanols. Relatively long-chain amines, which must be water-insoluble both as such and in the form of their hydrochlorides, suggest themselves as extractants having far more advantageous partition coefficients. Using such amines, it is possible to separate off the hydrogen chloride almost completely from a dilute hydrochloric acid.

The subsequent thermal cleavage of the amine hydrochlorides thus obtained, and the isolation of the anhydrous hydrogen chloride, can then be carried out in accordance with the processes described in West German published application No. 2,633,640 and in U.S. patent application Ser. No. 10,048.

U.S. Pat. No. 4,115,530 discloses:

(a) that aqueous hydrochloric acid is extracted with an amine or a mixture of an amine and an inert, water-immiscible solvent which boils below the amine used, the latter being tertiary alkylamines, tertiary aryldialkylamines, secondary arylalkylamines, primary alkylarylamines or mixtures thereof, which contain 14 to 36 carbon atoms in the nitrogen bonded side chains, which side chains include at most one nitrogen-bonded methyl group and at least one aliphatic radical containing at least 6 carbon atoms, the acid constant $K_a$ of the amine being less than $10^{-3}$, (b) that an inert, water immiscible solvent which boils below the amine used is added to the extract, unless the solvent has already been added in stage (a), (c) that the extract is distilled, the resulting vapors are condensed, the water is continuously removed from the two-phase condensate, and the organic phase is returned to the distillation process, and (d) that after removing the water, the extract is distilled under reflux at temperatures of between 100° and 250° C. at the column bottom, and the gaseous hydrogen chloride liberated at the top of the column is taken off.

According to the process of U.S. patent application Ser. No. 10,048, which does not form part of the prior art, the gaseous hydrogen chloride is obtained—in a modification of the process of U.S. Pat. No. 4,115,530—by heating the mixture of amine hydrochloride and solvent to a temperature below the boiling point of the solvent and separating off the hydrogen chloride liberated by passing an inert gas stream through the mixture.

U.S. patent application Ser. No. 10,048 discloses a method of manufacturing hydrogen chloride from solutions of amine hydrochlorides comprising:

(a) heating the solutions in an inert, organic essentially non-polar solvent at temperatures of about 120°–230° C., the solvent having a boiling point at least 20° C. above the temperature of heating;

(b) simultaneously with the heating, passing an inert gas stream through the heated solutions of (a) to split off hydrogen chloride and produce a mixture of hydrogen chloride and the inert gas; and (c) separating the hydrogen chloride from the mixture of (b) wherein the amine components of the amine hydrochlorides are tertiary alkylamines, tertiary aryldialkylamines, secondary arylalkylamines, primary alkylarylamines or mixtures thereof, each of the amine components containing 14 to 36 carbon atoms in the side chains bonded to nitrogen, not more than one of the side chains being a methyl group bonded to nitrogen and at least one of the side chains being an aliphatic radical, bonded to nitrogen, containing at least 6 carbon atoms.

It is true that these two processes mentioned for the first time permit the isolation of gaseous hydrogen chloride from dilute aqueous hydrochloric acid by means of special amines and subsequent thermolysis of the amine hydrochlorides formed, but they still suffer from shortcomings. Thus, the principal shortcoming is that the tertiary aliphatic amine decomposes, dependent on its structure and dependent on how high the temperature to which it is exposed. The decomposition takes place within a more or less short period, inter alia with the formation of primary and secondary aliphatic amines and alkyl chlorides, and the efficiency of the cleavage increasingly declines as a result thereof, since, though primary and secondary aliphatic amines extract hydrogen chloride effectively from dilute hydrochloric acid, their hydrochlorides are barely capable of thermal cleavage. There is therefore an initially insignificant formation of the interfering by-products, which however progressively becomes greater as the decomposition proceeds.

The process for isolating inexpensive hydrogen chloride by extracting dilute hydrochloric acid with amines however only operates economically if the relatively expensive amine can be recycled as far as possible without losses.

SUMMARY OF THE INVENTION

Having in mind the limitations of the prior art, it is an object of the present invention to provide a process for obtaining gaseous hydrogen chloride by extracting dilute aqueous hydrochloric acid with tertiary aliphatic amines and subsequent cleavage of the amine hydrochloride, in which the formation of the undesired decomposition products in either prevented or at least substantially repressed.

By dilute aqueous hydrochloric acid is meant hydrochloric acid having a concentration of 5 to 20 percent by weight in water and preferably 7 to 15 percent by weight.

Gaseous hydrogen chloride is obtained according to the present invention by extracting dilute aqueous hydrochloric acid with amines wherein an amine or a mixture of an amine and an inert, water-immiscible solvent boiling at not less than 120° C. is used and recycled material is passed over an absorbent. The amines are tertiary alkylamines which contain 14 to 36 carbon atoms in the nitrogen-bonded side chains, which side chains include at most one nitrogen-bonded methyl group and at least one nitrogen-bonded aliphatic radical containing at least 6 carbon atoms, the acid constant $K_a$ of the amine being less than $10^{-3}$.

The following process steps are carried out:

(a) aqueous hydrochloric acid is extracted with the amine or mixture of amine and inert, waterimmiscible solvent and recycled material which has been passed over an adsorbent;

(b) an inert, water-immiscible solvent boiling at not less than 120° C. is added to the extract, unless the solvent has already been added in stage (a);

(c) the extract is distilled, the resulting vapors are condensed, the water is continuously removed from the two-phase condensate, and the organic phase is returned to the distillation process;

(d) the extract is distilled, under reflux, after the water has been removed, and the gaseous hydrogen chloride liberated at the top of the column is taken off, or the hydrogen chloride is separated off at below the boiling point of the solvent by passing an inert gas stream through the mixture; and (e) the solvent containing the amine is recycled to the extraction process.

In stage (a) of the present invention, tertiary amines of a high degree of purity are employed and the accumulation of impurities and decomposition products is prevented by passing part or all of the recycled stream of amine and solvent over suitable adsorbents which select out the decomposition products, especially secondary and primary amines, from the mixture.

BRIEF DESCRIPTION OF THE DRAWING

Appended hereto are flow sheets which show the improvements of the present invention over the processes of U.S. Pat. No. 4,115,530 and U.S. patent application Ser. No. 10,048.

DESCRIPTION OF THE PREFERRED EMBODIMENTS

Figure 1:
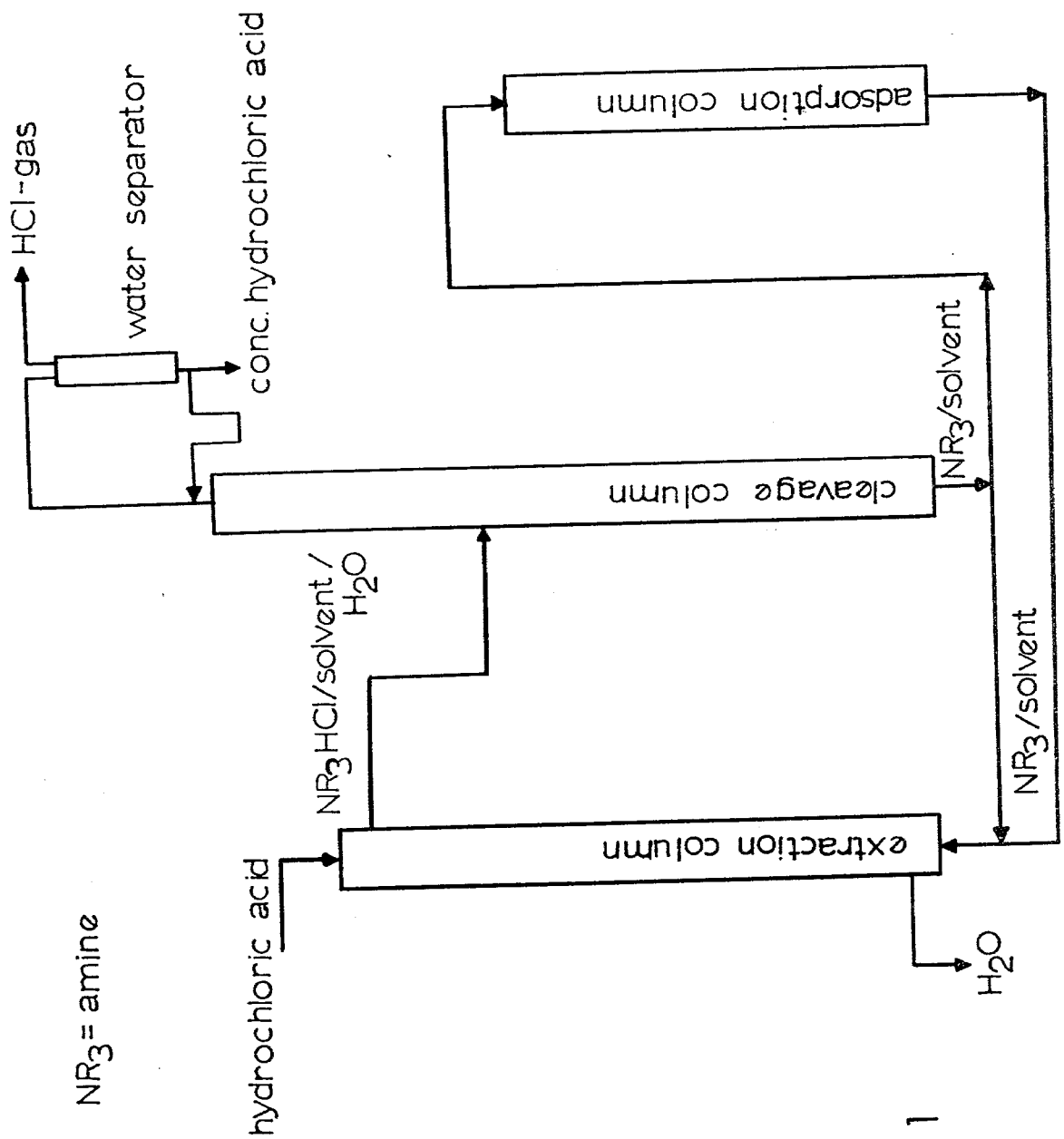
FIG. 1 is a flow sheet showing the improvement of the present invention over U.S. Pat. No. 4,115,530.
Figure 2:
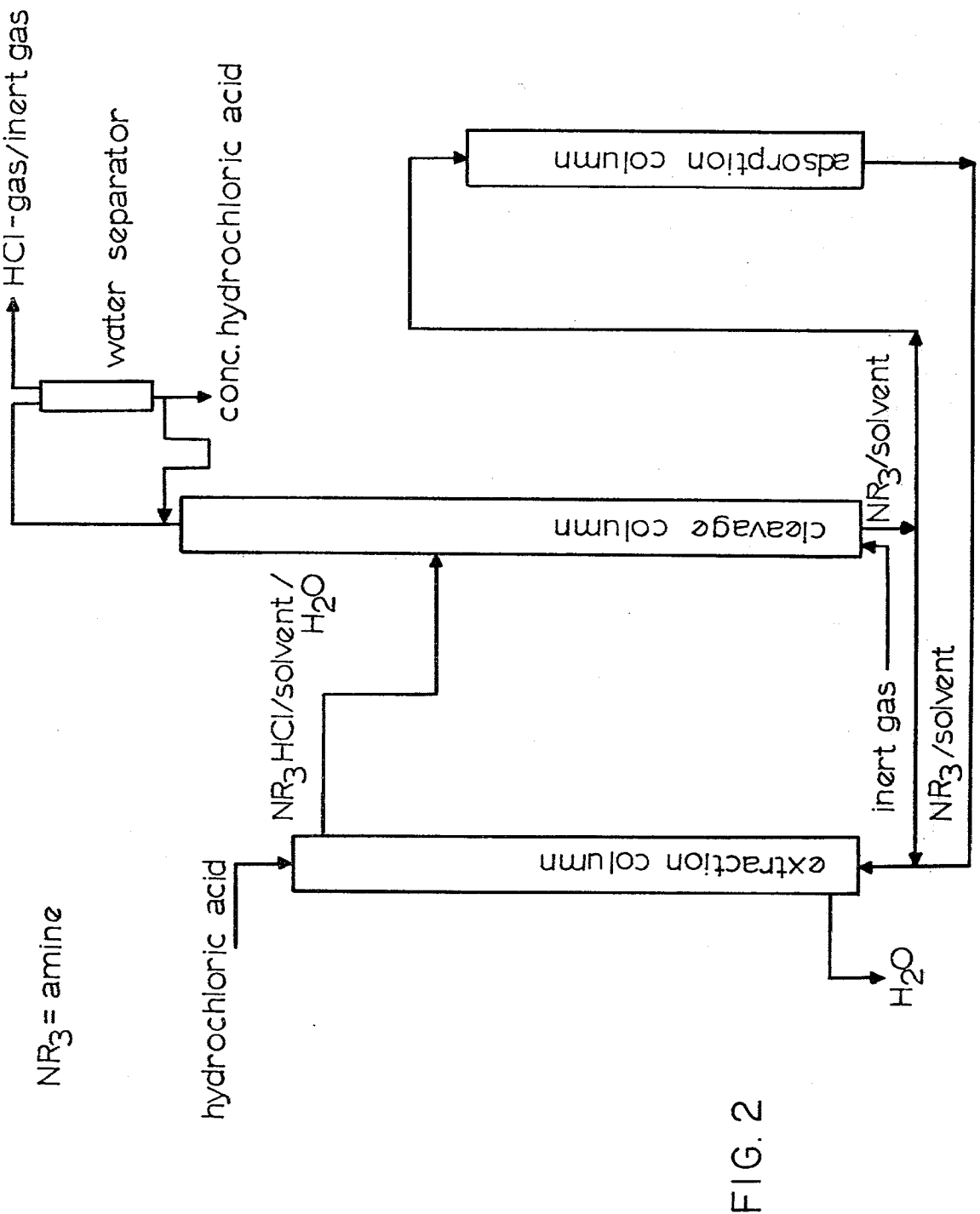
FIG. 2 is a flow sheet showing the improvement of the present invention over U.S. patent application Ser. No. 10,048.

The amines suitable for the process according to the present invention are tertiary alkylamines which have 14 to 36 carbon atoms in the nitrogen-bonded side chains. One of these side chains must contain at least 6 carbon atoms, that is to say must be a cyclohexyl, hexyl or isohexyl radical, and the amino group must not carry more than one methyl group.

The dissociation constant $K_a$ of the equilibrium reaction

$$NR_3H^+ + H_2O \rightleftharpoons NR_3 + H_3O^+$$

must be less than $10^{-3}$ to ensure adequate extraction of the hydrogen chloride. The dissociation constant $K_a$ for numerous amines is to be found in the literature, for example, Handbook of Chemistry and Physics, 51st edition (1970–71), page D 117 et seq.

Examples of suitable amines are trihexylamine, tricyclohexylamine, triheptylamine, trioctylamine, cyclohexyldiisooctylamine, cyclohexyl-4-heptyl-octylamine, cyclohexyl-2-ethylhexyl-octylamine, 2-ethylhexyl-4-heptyl-octylamine, tri-2-ethylhexylamine, di-2-ethylhexyl-methylamine, didecylethylamine, tridodecylamine, didodecyl-methylamine, dodecyl-diisopropylamine, dodecyl-dibutylamine, dodecyl-diisobutylamine, dodecyl-isobutyl-methylamine, diisopentadecyl-methylamine, diisopentadecyl-ethylamine and diisopentadecylisopropylamine.

The solvents used for the amines are organic liquids which under the process conditions are inert towards water, hydrogen chloride, amines and exposure to heat and which furthermore do not act as eluants for the impurities. Compounds which are as non-polar as possible, such as aromatic and aliphatic hydrocarbons, for example, xylenes, cumeme, cymenes, ethylbenzene, trimethylbenzenes, 1,2,4-triethylbenzene, 1,3,5-triethylbenzene, 1,2,3,4-tetramethylbenzene, 1,2,3,5-tetramethylbenzene, 3-phenylpentane, dodecylbenzene, nonane, decane, undecane, dodecane, tetradecane, decalin and tetralin, are particularly suitable for the process.

The appropriate concentration of the tertiary amine in the solution depends on the nature of the amine and the amount of the impurities to be separated off. In general, an amine-solvent ratio of about 1:1 to about 1:10 is used.

Suitable adsorbents for the process according to the invention are type aluminum oxides of high specific surface area (100 to 400 m²/g) in granular, tableted or crushed form. it has been found that the basicity of the aluminum oxide is not a deciding factor, and superficially basic, neutral or acidic aluminum oxide are employable. On the other hand, the level of activity is important. Products with activity levels 1 to 3, preferably activity levels 1 and 2, are useful. Aluminum oxide used as a chromatographic adsorbent is classified under 5 activity levels, according to the Brockmann scale. The aluminum oxides standarized by the Brockmann method differ with respect to their water content which, in percent by weight, is as follows: 1 (0%), 2 (3%), 3 (4.5%), 4 (9.5%), 5 (15%). Literature on the Brockmann method is given in O.A. Neumüller, Römpps Chemie-Lexikon, page 427 (1972).

Further suitable adsorbents are silica gels having specific surface areas of 500 to 700 m²/g, and silanzied silica gels (300 to 400 m²/g) and molecular. In the silica gels, the silica is present in the form of highly condensed polysilicic acids having a foliated structure of large surface areas. Silica gels wherein the hydropholic surfaces have been rendered hydrophobic by reaction with chlorosilanes are referred to as silanized silica gels.

The specific surface area is determined by the BET method, as published by S. Brunauer, P.H. Emmett and E. Teller in J. Am. Chem. Soc. 60, 309 (1938).

In general, the process according to the present invention is carried out at room temperature (15° to 30° C.), but it can also be advantageous to work at higher temperatures.

The adsorbent can be regenerated, without difficulties, by means of polar solvents.

The purity of the purified tertiary amine should if possible be above 99%, preferably about 99.5%, and especially preferentially above 99.9%.

An important advantage of the process according to the present invention is not only that amine losses are avoided but also that in the case of less stable amines it is altogether the first time that it becomes possible to carry out the HCl extraction, and cleavage of the hydrochloride, in practice, as has been found in the case of the embodiment of the trioctylamine-dodecane system. In other embodiments, a substantially greater temperature range, namely from 100° to 300° C., in which the cleavage can be operated economically, results.

Of course, corresponding extracts which have been obtained by methods other than by extraction of aqueous hydrochloric acid can also be decomposed by the process according to the present invention into hydrogen chloride and amine.

The examples and comparative examples which follow illustrate the process according to the present invention.

All percentage data are percentages by weight, unless stated otherwise.

The Comparative Examples A to D are intended to show, in comparative tests, that on addition of secondary amine hydrochloride to the tertiary amine hydrochloride an autocatalytic decomposition of the tertiary amine is observed during thermolysis.

COMPARATIVE EXAMPLE A 77.9 g (0.2 mol) of tri-(2-ethylhexyl)-amine hydrochloride were dissolved in an equal amount by weight of xylene in a 500 ml three-necked flask equipped with a gas inlet tube, thermometer and water separator surmounted by a reflux condenser. The contents of the flask were rapidly brought to a boil by dipping the flask into an oil bath pretreated to 220° C., and at the same time a uniform stream of nitrogen of 30 l/hr was introduced into the flask. The hydrogen chloride split off was trapped in two receivers arranged in series and charged with sodium hydroxide solution, and the HCl was determined titrimetrically. In the course of 6 hours, 97.3% of the theoretically possible amount of hydrogen chloride were split off from the hydrochloride. The bottom product was treated with sodium hydroxide solution and its composition was then examined by gas chromatography. <0.1% of secondary amine was found as a decomposition product.

COMPARATIVE EXAMPLE B 77.9 g (0.2 mol) of tri-(2-ethylhexyl)-amine hydrochloride were subjected to thermolysis in an apparatus according to Comparative Example A, after having added 7.8 g (0.028 mol) of di-(2-ethylhexyl)-amine hydrochloride in 78 g of xylene. In the course of 6 hours, 92.7% of the theoretically possible amount of hydrogen chloride were split off. The bottom product, after treatment with sodium hydroxide solution, contained—calculated as solvent-free materials—84.9% of tri-(2-ethylhexyl)-amine and 14.1% of di-(2-ethylhexyl)-amine. Since the starting product contained 8.8% of secondary amine, an additional 5.3% of decomposition product had accordingly formed during the cleavage of the hydrochloride.

COMPARATIVE EXAMPLE C

A solution of 60 g (0.2 mol) of tricyclohexylamine hydrochloride in 275 g of tert.-butyl-m-xylene was rapidly brought to a boil, in an apparatus according to Comparative Example A, by means of an oil bath preheated to 280° C., while passing a uniform stream of nitrogen of 30 l/hr into the apparatus. In the course of 6 hours, 93.7% of the theoretically possible amount of hydrogen chloride were split off from the hydrochloride. The bottom product, after treatment with sodium hydroxide solution, contained <0.1% of secondary amine as a decomposition product.

COMPARATIVE EXAMPLE D 60 g (0.2 mol) of tricyclohexylamine hydrochloride were subjected to thermolysis in an apparatus according to Comparative Example A, after addition of 6 g (0.028 mol) of dicyclohexylamine hydrochloride in 275 g of tert.-butyl-m-xylene. In the course of 6 hours, 98.6% of the theoretically possible amount of hydrogen chloride were liberated. The bottom product, after treatment with sodium hydroxide solution, consisted of 89.3% of tricyclohexylamine and 10.7% of dicyclohexylamine (calculated as solvent-free materials). Since the starting material contained 8.7% of secondary amine, an additional 2.0% of decomposition product had accordingly formed during the cleavage of the hydrochloride.

EXAMPLE 1

The example was carried out in a continuously operated installation according to FIG. 1 for the extraction of hydrochloric acid with amines and cleavage of the resulting amine hydrochlorides.

The extraction section consists of a 2.5 m high column (φ 30 mm) filled with glass beads (4 mm), in which a hydrochloric acid flows downwards in counter-current to a mixture of solvent and amine. At the top of the extraction column, the extract containing hydrochloride is taken off and fed to the cleavage column (height: 2,500 mm, φ 40 mm). The water entrained with the extract is removed, in the form of concentrated hydrochloric acid, at the top of the cleavage column with the aid of a water separator surmounting the column, the solvent serving as the entraining agent for the water. (The water can also be removed, without loss of HCl, in an upstream distillation stage.) The hydrogen chloride formed during the cleavage of the hydrochloride is taken off via the top of the cleavage column and in the course thereof passes through the water separator, while the HCl-free amine-solvent mixture is removed from the bottom of the cleavage column via a cooler and is returned to the extraction in the extraction column. A stream portion from the cleavage column is regenerated by passing it over acidic aluminum oxide (activity level 1; specific surface area 200 m²/g), with which an adsorption column (height 800 mm/φ 45 mm) is packed. The installation is operated under nitrogen as a blanketing gas.

Using a mixture of 1,155 g of tri-(2-ethylhexyl)-amine and 1,155 g of xylene (850 l/hr), 505.4 kg of 9.85 percent strength hydrochloric acid containing sodium chloride (250 ml/hr) were extracted in counter-current at 50° C. in the course of 1,913 hours. The extract was subjected to hydrochloride cleavage in the cleavage column at 148°–152° C.; it gave a total of 46.9 kg of hydrogen chloride, of which about one-third was obtained as concentrated hydrochloric acid, alongside hydrogen chloride gas. Since the cleavage takes place virtually quantitatively, an extraction rate of 94.2% can be calculated from the stated amount of HCl. To regenerate the amine, 100 ml per hour of the bottom product from the cleavage column were constantly passed over the adsorption column filled with aluminum oxide. After completion of the example, 1.036 g out of the 1,155 g of tri-(2-ethylhexyl)-amine employed were recovered unchanged; this corresponds to a loss of 119 g or 10.3% relative to amine employed. In addition, di-(2-ethyl-hexyl)-amine in an amount corresponding to 40 g of tertiary amine preparable therefrom could be isolated from the regeneration process. If this is taken into account, the amine loss is reduced to 6.8%. Relative to hydrogen chloride produced, the amine loss is calculated to be 0.17%.

COMPARATIVE EXAMPLE E

In an apparatus according to Example and FIG. 1 but without the adsorption column 1, 309.3 kg of 10.6 percent strength hydrochloric acid containing sodium chloride were extracted in counter-current with a mixture of 1.150 g of tri-(2-ethylhexyl)-amine and 1,150 g of xylene in the course of 1,175 hours. The extract, after cleavage of the hydrochloride, gave 32.0 kg of hydrogen chloride; this corresponds to an extraction rate of 97.6%. The amine formed in the bottom of the cleavage column was recycled, without prior regeneration, to the extraction. After completion of the experiment, 827 g of the 1,150 g of tri-(2-ethylhexyl)-amine employed were recovered unchanged; this corresponds to a loss of 323 g or 28.1%, relative to amine employed. On working up, di-(2-ethylhexyl)-amine and 2-ethylhexylamine could additionally be isolated in an amount corresponding to 186 g of tertiary amine preparable therefrom. If this is taken into account, the amine loss is reduced to 11.9%. Relative to hydrogen chloride produced, the amine loss is calculated to be 0.43%.

EXAMPLE 2

In an apparatus according to FIG. 1 Example 1, 279.1 kg of 9.74 percent strength hydrochloric acid containing sodium chloride were extracted in counter-current at 80°–90° C. with a mixture of 1,750 g of trioctylamine and 7,000 g of dodecane in the course of 1,087 hours. The extract, after cleavage of the hydrochloride at 222°–224° C. gave 14.5 kg of hydrogen chloride; this corresponds to an extraction rate of 53.3%. The amine obtained at the bottom of the cleavage column was regenerated completely by being passed over a large-sized adsorption column (height 1,000 mm, φ mm), packed with acidic aluminum oxide (as described in Example 1), before being returned to the extraction. After completion of the example, 1,438 g out of 1,750 g of trioctylamine employed were recovered unchanged; this corresponds to a loss of 312 g or 17.8% relative to amine employed. Dioctylamine and octylamine, in an amount corresponding to 183 g of tertiary amine preparable therefrom, could be isolated from the regeneration process. If this figure is taken into account, the amine loss is reduced to 7.4%. Relative to hydrogen chloride produced, the amine loss is calculated to be 0.98%.

COMPARATIVE EXAMPLE F

An approximately 10 percent strength hydrochloric acid containing sodium chloride was extracted in counter-current at 80° to 90° C. with a mixture of 1 part by weight of trioctylamine and 4 parts by weight of dodecane in the apparatus according to FIG. 1 Example 1, but without the adsorption column and, regeneration. The extract was subjected to hydrochloride cleavage at 227° C. The example had to be abandoned after a short time because the pipe lines and extraction column became blocked by copiously formed dioctylamine hydrochloride.

EXAMPLE 3 AND COMPARATIVE EXAMPLE G

In an apparatus according to FIG. 1, Example 1, 127.6 kg of 10.95 percent strength hydrochloric acid containing sodium chloride were extracted in counter-current at 80° to 90° C. with a mixture of 1,900 g of trioctylamine and 7,500 g of tetradecane in the course of 481 hours. The extract, after cleavage of the hydrochloride at 260° to 262° C., gave 9.4 kg of hydrogen chloride; this corresponds to an extraction rate of 67.3%. The amine obtained at the bottom of the cleavage column was regenerated completely by being passed over a large-sized adsorption column (height 1,000 mm, φ 100 mm), packed with acidic aluminum oxide, before being returned to the extraction. After completion of the example, 1,373.6 g out of 1,900 g of trioctylamine employed were recovered unchanged; this corresponds to a loss of 526.4 g of 27.7% relative to amine employed. Dioctylamine and octylamine, in an amount corresponding to 441.4 g of tertiary amine preparable therefrom, could be isolated from the regeneration process. If this figure is taken into account, the amine loss is reduced to 4.5%. Relative to hydrogen chloride produced, the amine loss is calculated to be 0.9%.

If, however, the process is carried out without the adsorption column and regeneration (Comparative Example G), the example fails for the reasons given under Comparative Example F.

We claim:

1. In a process for obtaining gaseous hydrogen chloride by extracting dilute aqueous hydrochloric acid with amines, comprising:
   (a) extracting aqueous hydrochloric acid with a mixture of an amine and an inert, water-immiscible solvent boiling at not less than 120° C., said amine comprising a tertiary alkylamine having 14 to 36 carbon atoms in the nitrogen-bonded side chains, said side chains including at most one nitrogen-bonded methyl group and at least one nitrogen-bonded aliphatic radical containing at least 6 carbon atoms, the acid constant $K_a$ of said amine being less than $10^{-3}$;
   (b) carrying out a first distillation of said extract, condensing resulting vapors, removing water continuously from a two phase condensate and returning an organic phase to said first distillation;

(c) carrying out a second distillation under reflux of said extract after water has been removed, liberating said gaseous hydrogen chloride at the top of the column of said second distillation and taking it off; and (d) recycling the solvent containing the amine to said extracting; the improvement comprising:

(e) passing at least a portion of the mixture of amine, solvent and any included impurities over an adsorbent before being employed in stage (a), said adsorbent selected from the group consisting of Type I aluminum oxide having a specific surface area of about 100 to about 400 m$^2$/g, silica gel having a specific surface area of about 500 to about 700 m$^2$/g and silanized silica gel having a specific surface area of about 300 to about 400 m$^2$/g, said surface area being measured by the BET method.

2. In a process for obtaining gaseous hydrogen chloride by extracting dilute aqueous hydrochloric acid with amines, comprising:

(a) extracting said aqueous hydrochloric acid with an amine, said amine comprising a tertiary alkylamine having 14 to 36 carbon atoms in the nitrogen-bonded side chains, said side chains including at most one nitrogen-bonded methyl group and at least one nitrogen-bonded aliphatic radical containing at least 6 carbon atoms, the acid constant $K_a$ of said amine being less than $10^{-3}$;

(b) adding an inert, water-immiscible solvent boiling at not less than 120° C. to the extract;

(c) carrying out a first distillation of said extract, condensing the resulting vapors, removing water continuously removed from a two-phase condensate, and returning an organic phase to said first distillation;

(d) carrying out a second distillation under reflux of said extract after water has been removed, liberating said gaseous hydrogen chloride at the top of the column of said second distillation and taking it off; and (e) recycling the solvent containing the amine to said extracting, the improvement comprising:

(f) passing at least a portion of the mixture of amine, solvent and any included impurities over an adsorbent before being employed in stage (a), said adsorbent selected from the group consisting of Type I aluminum oxide having a specific surface area of about 100 to about 400 m$^2$/g, silica gel having a specific surface area of about 500 to about 700 m$^2$/g and silanized silica gel having a specific surface area of about 300 to about 400 m$^2$/g, said surface area being measured by the BET method.

3. The process of claims 1 or 2, wherein the extraction is conducted with a quantity of amine lying approximately 5–10% above the amount equivalent to the hydrochloric acid content.

4. The process of claims 1 or 2, wherein approximately the same parts by weight of amine and solvent are utilized.

5. The process of claims 1 or 2, wherein said dilute aqueous hydrochloric acid has a hydrochloric acid concentration lower than about 20%.

6. The process of claims 1 or 2, wherein said dilute aqueous hydrochloric acid has a hydrochloric acid concentration of about 2 to 20 percent by weight.

7. The process of claims 1 or 2 wherein said dilute aqueous hydrochloric acid has a hydrochloric acid concentration of about 5 to 15 percent by weight.

8. The process of claim 1, wherein said inert solvents include straight-chain or branched, aliphatic, cycloaliphatic, araliphatic or aromatic, entirely or substantially non-polar hydrocarbons which have at least 6 to 20 carbon atoms and boil above 120° C.

9. The process of claim 1, wherein cleavage of the amine hydrochlorides is carried out in step (c) at temperatures of 120° to 300° C. at the column bottom.

10. The process of claim 2, wherein said inert solvents include straight-chain or branched, aliphatic, cycloaliphatic, araliphatic or aromatic, entirely or substantially non-polar hydrocarbons which have at least 6 to 20 carbon atoms and boil above 120° C.

11. The process of claim 2, wherein cleavage of the amine hydrochlorides is carried out in step (d) at temperatures of 120° to 300° C. at the column bottom.

12. In a process for obtaining gaseous hydrogen chloride by extracting dilute aqueous hydrochloric acid with amines, comprising:

(a) extracting aqueous hydrochloric acid with a mixture of an amine and an inert, water-immiscible solvent boiling at not less than 120° C., said amine comprising a tertiary alkylamine having 14 to 36 carbon atoms in the nitrogen-bonded side chains, said side chains including at most one nitrogen-bonded methyl group and at least one nitrogen-bonded aliphatic radical containing at least 6 carbon atoms, the acid constant $K_a$ of said amine being less than $10^{-3}$;

(b) carrying out a first distillation of said extract, condensing resulting vapors, removing water continuously from a two-phase condensate and returning an organic phase to said first distillation;

(c) separating said gaseous hydrogen chloride off from said extract after water has been removed at below the boiling point of the solvent by passing an inert gas stream through the mixture; and (d) recycling the solvent containing the amine to said extracting; the improvement comprising:

(e) passing at least a portion of the mixture of amine, solvent and any included impurities over an adsorbent before being employed in stage (a), said adsorbent selected from the group consisting of Type I aluminum oxide having a specific surface area of about 100 to about 400 m$^2$/g, silica gel having a specific surface area of about 500 to about 700 m$^2$/g and silanized silica gel having a specific surface area of about 300 to about 400 m$^2$/g, said surface area being measured by the BET method.

13. In a process for obtaining gaseous hydrogen chloride by extracting dilute aqueous hydrochloric acid with amines, comprising:

(a) extracting said aqueous hydrochloric acid with an amine, said amine comprising a tertiary alkylamine having 14 to 36 carbon atoms in the nitrogen-bonded side chains, said side chains including at most one nitrogen bonded methyl group and at least one nitrogen-bonded aliphatic radical containing at least 6 carbon atoms, the acid constant $K_a$ of said amine being less than $10^{-3}$;

(b) adding an inert, water-immiscible solvent boiling at not less than 120° C. to the extract;

(c) carrying out a first distillation of said extract, condensing resulting vapors, removing water continuously removed from a two-phase condensate, and returning an organic phase to said first distillation;
(d) separating said gaseous hydrogen chloride off from said extract after water has been removed at below the boiling point of the solvent by passing an inert gas stream through the mixture; and
(e) recycling the solvent containing the amine to said extracting; the improvement comprising:
(f) passing at least a portion of the mixture of amine, solvent and any included impurities over an adsorbent before being employed in stage (a), said adsorbent selected from the group consisting of Type I aluminum oxide having a specific surface area of about 100 to about 400 m$^2$/g, silica gel having a specific surface area of about 500 to about 700 m$^2$/g and silanized silica gel having a specific surface area of about 300 to about 400 m$^2$/g, said surface area being measured by the BET method.

14. The process of claims 12 or 13, wherein said gaseous hydrogen chloride is separated off with heating at a temperature of about 120°–230° C. and said solvent has a boiling point at least 20° C. above said temperature of heating.

* * * * *